United States Patent
Zhevelev et al.

(10) Patent No.: US 9,952,349 B1
(45) Date of Patent: Apr. 24, 2018

(54) HUMAN MOTION DETECTION SYSTEM

(71) Applicant: Tyco Fire & Security GmbH, Neuhausen am Rheinfall (CH)

(72) Inventors: Boris Zhevelev, Rishon le Zion (IL); Yehuda Schviki, Rishon le Zion (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/453,402

(22) Filed: Mar. 8, 2017

(51) Int. Cl.
  *G01V 8/10* (2006.01)
  *G01J 1/04* (2006.01)

(52) U.S. Cl.
  CPC .............. *G01V 8/10* (2013.01); *G01J 1/0414* (2013.01)

(58) Field of Classification Search
  CPC .................................. G01V 8/00; G01J 1/0414
  See application file for complete search history.

(56) References Cited

U.S. PATENT DOCUMENTS 5,499,016 A * 3/1996 Pantus ................ G08B 29/046
                                                    250/222.1
6,080,981 A * 6/2000 Payne ..................... G01V 8/10
                                                    250/221

* cited by examiner

*Primary Examiner* — David Porta
*Assistant Examiner* — Mindy Yu
(74) *Attorney, Agent, or Firm* — HoustonHogle LLP

(57) ABSTRACT

A motion detection system including a lens arranged to focus infrared radiation; a variably positionable optical attenuator arranged for variable positioning thereof opposite the focusing lens, operable for variably attenuating infrared radiation focused by the focusing lens, an extent and a magnitude of the variable attenuation being dependent on a position and on a set of physical characteristics of the variably positionable optical attenuator; a PIR sensor positioned opposite the focusing lens and the variably positionable optical attenuator, operable for sensing the focused and attenuated infrared radiation; and a human motion detection indication generator operable for ascertaining whether an intensity of infrared radiation sensed by the PIR sensor is above a human-generated infrared radiation detection threshold and, responsive thereto, for generating an indication of detection of human motion.

36 Claims, 2 Drawing Sheets

HUMAN MOTION DETECTION SYSTEM

FIELD OF THE INVENTION

The present invention relates generally to human-motion detection systems.

BACKGROUND OF THE INVENTION

Commercially available motion detection systems typically lack the capability of differentiating between motion of humans which is typically desired to be detected and motion of animals, such as house pets which is typically desired to ignored. The present invention provides improved motion detection systems operable for differentiating between motion of humans and motion of animals, such as house pets.

SUMMARY OF THE INVENTION

The present invention seeks to provide improved human-motion detection systems.

There is thus provided in accordance with a preferred embodiment of the present invention a motion detection system including a focusing lens arranged to focus infrared radiation; a variably positionable optical attenuator arranged for variable positioning thereof opposite the focusing lens and operable for variably attenuating at least a portion of the infrared radiation focused by the focusing lens, at least one of an extent of the variably attenuated portion of the focused infrared radiation and a magnitude of the variable attenuation being dependent on at least one of a position of the variably positionable optical attenuator opposite the focusing lens and a set of physical characteristics of the variably positionable optical attenuator; a PIR sensor positioned opposite the focusing lens and opposite the variably positionable optical attenuator, the PIR sensor being operable for sensing at least part of the focused infrared radiation focused by the focusing lens and at least part of the attenuated infrared radiation attenuated by the variably positionable optical attenuator; and a human motion detection indication generator communicating with the PIR sensor and operable for ascertaining whether an intensity of infrared radiation sensed by the PIR sensor is above a human-generated infrared radiation detection threshold and, responsive to ascertaining that the intensity of infrared radiation sensed by the PIR sensor is above the human-generated infrared radiation detection threshold, for generating an indication of detection of human motion.

Preferably, the focusing lens is arranged to focus infrared radiation originating from a human motion detection field including at least an area generally inaccessible to house pets, and infrared radiation originating from a house pet motion detection field including at least an area accessible to house pets. Preferably, both the human motion detection field and the house pet motion detection field also include corresponding areas accessible to humans.

Preferably, the focusing lens is a segmented Fresnel lens including at least a first segment having a first degree of focus and arranged to focus the infrared radiation originating from the human motion detection field, and at least a second segment having a second degree of focus and arranged to focus infrared radiation originating from a house pet motion detection field. Preferably, the segmented Fresnel lens is at least one of a spherical segmented Fresnel lens and a cylindrical segmented Fresnel lens. Preferably, the second degree of focus is less than the first degree of focus.

Preferably, the human-generated infrared radiation detection threshold is ambient temperature-dependent.

Preferably, at least one particular position of the variably positionable optical attenuator opposite the focusing lens is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold. Preferably, the at least one particular position of the variably positionable optical attenuator, arranged to attenuate the infrared radiation originating from the house pet motion detection field to the at least one of the extent and the magnitude resulting in the intensity of the attenuated infrared radiation originating from the house pet motion detection field which is below the human-generated infrared radiation detection threshold, is ambient temperature-dependent.

Preferably, at least one particular set of physical characteristics of the variably positionable optical attenuator is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold.

Preferably, at least one combination of at least one position of the variably positionable optical attenuator opposite the focusing lens and at least one particular set of physical characteristics of the variably positionable optical attenuator is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold. Preferably, the at least one particular position of the variably positionable optical attenuator, arranged in combination with the at least one particular set of physical characteristics of the variably positionable optical attenuator to attenuate the infrared radiation originating from the house pet motion detection field to the at least one of the extent and the magnitude resulting in the intensity of the attenuated infrared radiation originating from the house pet motion detection field which is below the human-generated infrared radiation detection threshold, is ambient temperature-dependent.

Preferably, the set of physical characteristics of the variably positionable optical attenuator includes at least one of a variable thickness of the variably positionable optical attenuator, apertures formed in the variably positionable optical attenuator, the apertures being arranged to allow at least part of the focused infrared radiation to freely pass therethrough, and a scattering surface of the variably positionable optical attenuator, which scattering surface is formed to at least partially scatter at least part of the focused infrared radiation.

Preferably, the variably positionable optical attenuator is variably positionable between the focusing lens and the PIR sensor. Preferably, the variably positionable optical attenuator is arranged for manual variable positioning thereof opposite the focusing lens. Additionally or alternatively, the variably positionable optical attenuator is arranged for automatic variable positioning thereof opposite the focusing lens.

Preferably, the motion detection system also includes a motorized position controller operable for automatically variably positioning the variably positionable optical attenuator opposite the focusing lens. Preferably, the automatic variable positioning of the variably positionable optical attenuator opposite the focusing lens is ambient temperature-dependent.

There is also provided in accordance with another preferred embodiment of the present invention a motion detection system including a focusing mirror arranged to focus infrared radiation; a variably positionable optical attenuator arranged for variable positioning thereof opposite the focusing mirror and operable for variably attenuating at least a portion of the infrared radiation focused by the focusing mirror, at least one of an extent of the variably attenuated portion of the focused infrared radiation and a magnitude of the variable attenuation being dependent on at least one of a position of the variably positionable optical attenuator opposite the focusing mirror and a set of physical characteristics of the variably positionable optical attenuator; a PIR sensor positioned opposite the focusing mirror and opposite the variably positionable optical attenuator, the PIR sensor being operable for sensing at least part of the focused infrared radiation focused by the focusing mirror and at least part of the attenuated infrared radiation attenuated by the variably positionable optical attenuator; and a human motion detection indication generator communicating with the PIR sensor and operable for ascertaining whether an intensity of infrared radiation sensed by the PIR sensor is above a human-generated infrared radiation detection threshold and, responsive to ascertaining that the intensity of infrared radiation sensed by the PIR sensor is above the human-generated infrared radiation detection threshold, for generating an indication of detection of human motion.

Preferably, the focusing mirror is arranged to focus infrared radiation originating from a human motion detection field including at least an area generally inaccessible to house pets, and infrared radiation originating from a house pet motion detection field including at least an area accessible to house pets. Preferably, both the human motion detection field and the house pet motion detection field also include corresponding areas accessible to humans.

Preferably, the focusing mirror is a segmented mirror including at least a first segment having a first degree of focus and arranged to focus the infrared radiation originating from the human motion detection field, and at least a second segment having a second degree of focus and arranged to focus infrared radiation originating from a house pet motion detection field. Preferably, the second degree of focus is less than the first degree of focus.

Preferably, the human-generated infrared radiation detection threshold is ambient temperature-dependent.

Preferably, at least one particular position of the variably positionable optical attenuator opposite the focusing mirror is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold. Preferably, the at least one particular position of the variably positionable optical attenuator, arranged to attenuate the infrared radiation originating from the house pet motion detection field to the at least one of the extent and the magnitude resulting in the intensity of the attenuated infrared radiation originating from the house pet motion detection field which is below the human-generated infrared radiation detection threshold, is ambient temperature-dependent.

Preferably, at least one particular set of physical characteristics of the variably positionable optical attenuator is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold.

Preferably, at least one combination of at least one position of the variably positionable optical attenuator opposite the focusing mirror and at least one particular set of physical characteristics of the variably positionable optical attenuator is suitable for attenuating, by the variably positionable optical attenuator, the infrared radiation originating from the house pet motion detection field to at least one of an extent and a magnitude resulting in an intensity of the attenuated infrared radiation originating from the house pet motion detection field which is below the human-generated infrared radiation detection threshold. Preferably, the at least one particular position of the variably positionable optical attenuator, arranged in combination with the at least one particular set of physical characteristics of the variably positionable optical attenuator to attenuate the infrared radiation originating from the house pet motion detection field to the at least one of the extent and the magnitude resulting in the intensity of the attenuated infrared radiation originating from the house pet motion detection field which is below the human-generated infrared radiation detection threshold, is ambient temperature-dependent.

Preferably, the set of physical characteristics of the variably positionable optical attenuator includes at least one of a variable thickness of the variably positionable optical attenuator, apertures formed in the variably positionable optical attenuator, the apertures being arranged to allow at least part of the focused infrared radiation to freely pass therethrough, and a scattering surface of the variably positionable optical attenuator, which scattering surface is formed to at least partially scatter at least part of the focused infrared radiation.

Preferably, the variably positionable optical attenuator is variably positionable between the focusing mirror and the PIR sensor. Preferably, the variably positionable optical attenuator is arranged for manual variable positioning thereof opposite the focusing mirror. Additionally or alternatively, the variably positionable optical attenuator is arranged for automatic variable positioning thereof opposite the focusing mirror.

Preferably, the motion detection system also includes a motorized position controller operable for automatically variably positioning the variably positionable optical attenuator opposite the focusing mirror. Preferably, the automatic variable positioning of the variably positionable optical attenuator opposite the focusing mirror is ambient temperature-dependent. Preferably, the focusing mirror is a concave mirror.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
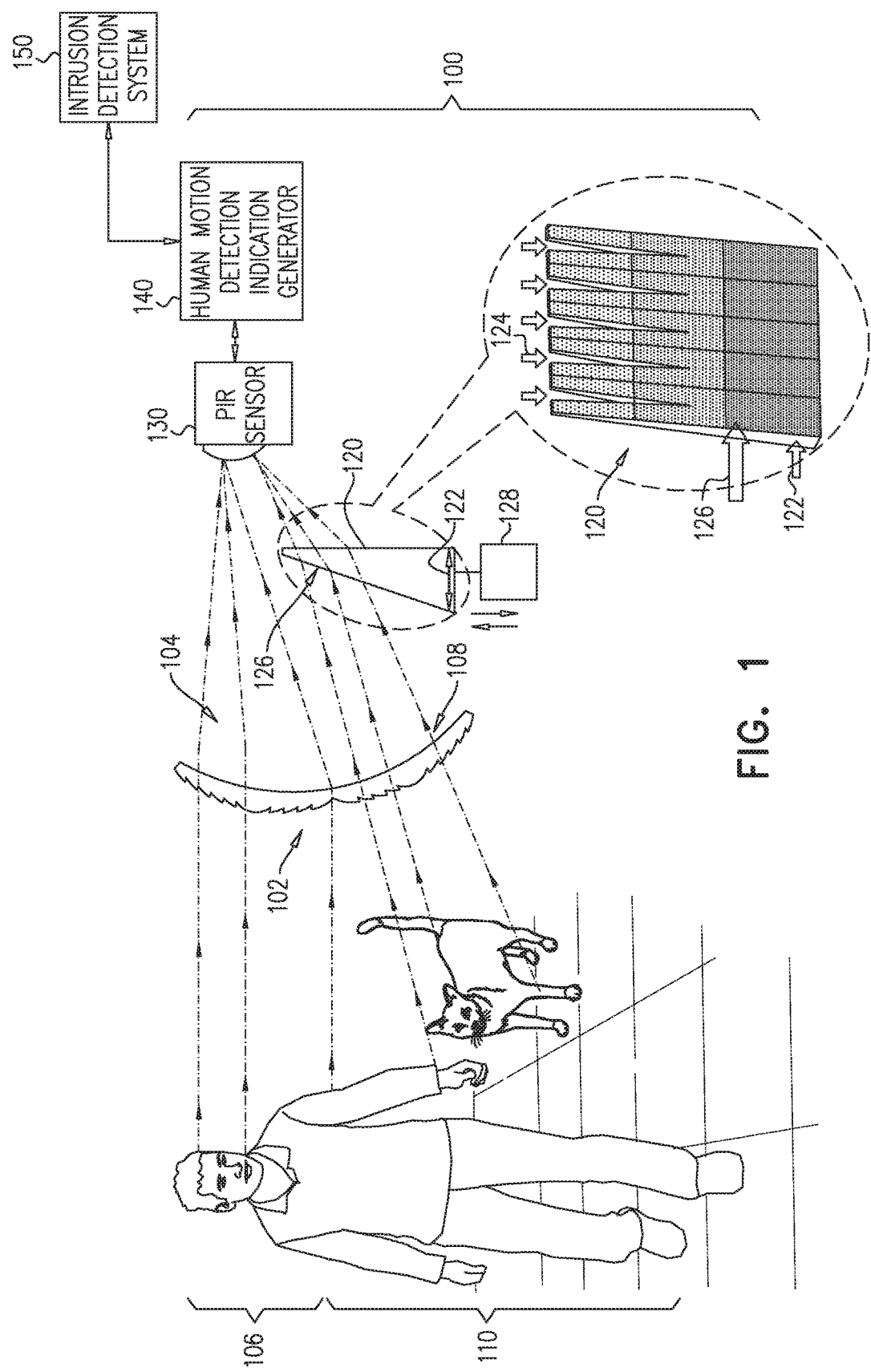
FIG. 1 is a simplified illustration of a motion detection system, constructed and operative in accordance with a preferred embodiment of the present invention.

Reference is now made to FIG. 1, which is a simplified illustration of a motion detection system, constructed and operative in accordance with a preferred embodiment of the present invention.

As shown in FIG. 1, there is provided a motion detection system 100 including a focusing lens such as, for example, a segmented Fresnel lens 102. It is appreciated that segmented Fresnel lens 102 may be spherical or cylindrical. Segmented Fresnel lens 102 preferably includes an upper segment 104 having a first degree of focus and is arranged to focus infrared radiation originating from an upper motion detection field 106. It is appreciated that upper motion detection field 106 preferably includes an area which is generally at an elevation accessible to humans but generally inaccessible to house pets, such as a height typical of an upper part of a typical human body. Upper motion detection field 106 thereby preferably defines an area wherein infrared radiation emitting therefrom is typically human-generated infrared radiation. Therefore, infrared radiation focused by upper segment 104 will typically be indicative of human motion within upper motion detection field 106.

Segmented Fresnel lens 102 preferably also includes a lower segment 108 having a second degree of focus and is arranged to focus infrared radiation originating from a lower motion detection field 110. It is appreciated that lower motion detection field 110 preferably includes an area which is generally at a height accessible to house pets, thereby defining an area wherein at least part of infrared radiation emitting therefrom is typically pet-generated infrared radiation.

It is further appreciated that, in the example of FIG. 1, the second degree of focus of lower segment 108 is of a lesser degree than the first degree of focus of upper segment 104, resulting in focusing of typically pet-generated infrared radiation to a lesser degree than typically human-generated infrared radiation and facilitating reliable detection, by motion detection system 100X), of typically human-generated infrared radiation, while ignoring typically pet-generated infrared radiation.

It is yet further appreciated that while lower motion detection field 110 preferably includes an area which is generally at an elevation accessible to house pets, humans, particularly the lower body part thereof, may also traverse lower motion detection field 110. Therefore, infrared radiation focused by lower segment 108 may include pet-generated infrared radiation and human-generated infrared radiation, being indicative of either human or pet motion within lower motion detection field 110.

To further differentiate between typically human-generated infrared radiation originating from upper motion detection field 106 and typically pet-generated infrared radiation originating from lower motion detection field 110, a variably positionable optical attenuator 120 is preferably arranged for variable positioning thereof opposite segmented Fresnel lens 102, and is preferably operable for variably attenuating at least a portion of the infrared radiation focused by segmented Fresnel lens 102. It is appreciated that at least one of an extent and a magnitude of the attenuation of variably positionable optical attenuator 120 is dependent on at least one of a position of variably positionable optical attenuator 120 opposite the segmented Fresnel lens and a set of physical characteristics of variably positionable optical attenuator 120.

It is a particular feature of the present preferred embodiment that variably positionable optical attenuator 120 may be positioned to attenuate typically pet-generated infrared radiation originating from lower motion detection field 110 to at least one of a greater extent and a greater magnitude than that of typically human-generated infrared radiation originating from upper motion detection field 106, preferably resulting in an intensity of the attenuated typically pet-generated infrared radiation which is below a human-generated infrared radiation detection threshold and facilitating reliable detection, by motion detection system 100, of typically human-generated infrared radiation, while ignoring typically pet-generated infrared radiation.

In the example of FIG. 1, variably positionable optical attenuator 120 may be positioned opposite lower segment 108 of segmented Fresnel lens 102, thereby attenuating infrared radiation originating from lower motion detection field 110 and which is typically pet-generated, to a greater extent than infrared radiation originating from upper motion detection field 106 and which is typically human-generated. Positioning of variably positionable optical attenuator opposite segmented Fresnel lens 102 may be achieved manually or automatically by a motorized position controller 128.

It is appreciated that the intensity of infrared radiation emitted by humans or pets may be dependent on an ambient temperature of the environment. It is therefore also appreciated that the desired position of variably positionable optical attenuator 120 opposite segmented Fresnel lens 102 to attenuate infrared radiation originating from lower motion detection field 110 to a greater extent than infrared radiation originating from upper motion detection field 106 may be ambient temperature-dependent. It is therefore appreciated that both manual and automatic variable positioning of variably positionable optical attenuator 120 opposite said segmented Fresnel lens 102 may be ambient temperature-dependent.

Furthermore, as shown in FIG. 1, a set of physical characteristics of variably positionable optical attenuator 120 may include, for example, a variable thickness 122 of variably positionable optical attenuator 120. It is appreciated that variably positionable optical attenuator 120 is preferably formed of a material which is at least partially transparent to infrared radiation, such as polyethylene, wherein the degree of transparency of variably positionable optical attenuator 120 is at least partially determined by thickness 122 thereof. It is a particular feature of the present preferred embodiment that variably positionable optical attenuator 120 is preferably formed with a thickness 122 which varies over a vertical dimension thereof, thereby providing varying degrees of attenuation of infrared radiation focused by segmented Fresnel lens 102, which varying degrees of attenuation correspond with the position of variably positionable optical attenuator 120 opposite segmented Fresnel lens 102.

In the example of FIG. 1, thickness 122 of variably positionable optical attenuator 120 is greater in a portion of variably positionable optical attenuator 120 positioned opposite lower segment 108 of segmented Fresnel lens 102 than in a portion of variably positionable optical attenuator 120 positioned opposite upper segment 104 of segmented Fresnel lens 102, thereby attenuating infrared radiation originating from lower motion detection field 110, which is typically pet-generated, by a greater magnitude than infrared radiation originating from upper motion detection field 106 and which is typically human-generated, preferably resulting in an intensity of attenuated typically pet-generated infrared radiation which is below a human-generated infrared radiation detection threshold and facilitating reliable detection, by motion detection system 100, of typically human-generated infrared radiation, while ignoring typically pet-generated infrared radiation.

As further illustrated in FIG. 1, the set of physical characteristics of variably positionable optical attenuator 120 may also include, for example, a multiplicity of apertures 124 formed in variably positionable optical attenuator 120. It is appreciated that apertures 122 are preferably arranged to allow at least part of infrared radiation focused by segmented Fresnel lens 102 to freely pass therethrough without being attenuated by variably positionable optical attenuator 120. It is therefore another particular feature of the present preferred embodiment of the present invention that variably positionable optical attenuator 120 provides varying degrees and extent of attenuation of infrared radiation focused by segmented Fresnel lens 102, which varying degrees and extent of attenuation also correspond to the position of apertures 124 of variably positionable optical attenuator 120 opposite segmented Fresnel lens 102.

In the example of FIG. 1, apertures 124 of variably positionable optical attenuator 120 are positioned opposite lower segment 108 of segmented Fresnel lens 102, thereby allowing part of infrared radiation originating from upper motion detection field 106, which is typically human-generated, to freely pass therethrough without being attenuated by variably positionable optical attenuator 120, preferably resulting in an intensity of attenuated typically pet-generated infrared radiation which is below a human-generated infrared radiation detection threshold and facilitating reliable detection, by motion detection system 100, of typically human-generated infrared radiation, while ignoring typically pet-generated infrared radiation.

As yet further illustrated in FIG. 1, the set of physical characteristics of variably positionable optical attenuator 120 may also include, for example, a scattering surface 126 of variably positionable optical attenuator 120, which scattering surface 126 is formed to at least partially scatter at least part of the infrared radiation focused by segmented Fresnel lens 102. It is appreciated that the scattering nature of scattering surface 126 typically corresponds, for example, to the physical characteristics of the material forming scattering surface 126. It is therefore another particular feature of the present preferred embodiment of the present invention that variably positionable optical attenuator 120 provides varying degrees and extent of attenuation of infrared radiation focused by segmented Fresnel lens 102, which varying degrees and extent of attenuation also correspond to the position and physical characteristics of scattering surface 126 of variably positionable optical attenuator 120 opposite segmented Fresnel lens 102.

In the example of FIG. 1, scattering surface 126 of variably positionable optical attenuator 120 is formed on a portion of variably positionable optical attenuator 120 positioned opposite lower segment 108 of segmented Fresnel lens 102, thereby scattering and attenuating infrared radiation originating from lower motion detection field 110, which is typically pet-generated, by a greater magnitude than infrared radiation originating from upper motion detection field 106 and which is typically human-generated, preferably resulting in an intensity of attenuated typically pet-generated infrared radiation which is below a human-generated infrared radiation detection threshold and facilitating reliable detection, by motion detection system 100, of typically human-generated infrared radiation, while ignoring typically pet-generated infrared radiation.

Motion detection system 100 preferably also includes a PIR sensor 130 positioned opposite segmented Fresnel lens 102 and opposite the variably positionable optical attenuator 120. PIR sensor 130 is preferably operable for sensing at least part of the infrared radiation focused by segmented Fresnel lens 102 and at least part of the infrared radiation attenuated by variably positionable optical attenuator 120.

A human motion detection indication generator 140 preferably communicates with PIR sensor 130 and is preferably operable for ascertaining whether an intensity of infrared radiation sensed by PIR sensor 130 is above a human-generated infrared radiation detection threshold. It is appreciated that the intensity of infrared radiation emitted by humans or pets may be dependent on an ambient temperature of the environment. It is therefore appreciated that the human-generated infrared radiation detection threshold may be ambient temperature-dependent.

Responsive to ascertaining that the intensity of infrared radiation sensed by PIR sensor 130 is above the human-generated infrared radiation detection threshold, human motion detection indication generator 140 is also preferably operable for generating an indication of detection of human motion. The indication of detection of human motion generated by human motion detection indication generator 140 may be communicated, for example, to a premises monitoring system or an intrusion detection system 150.

Figure 2:
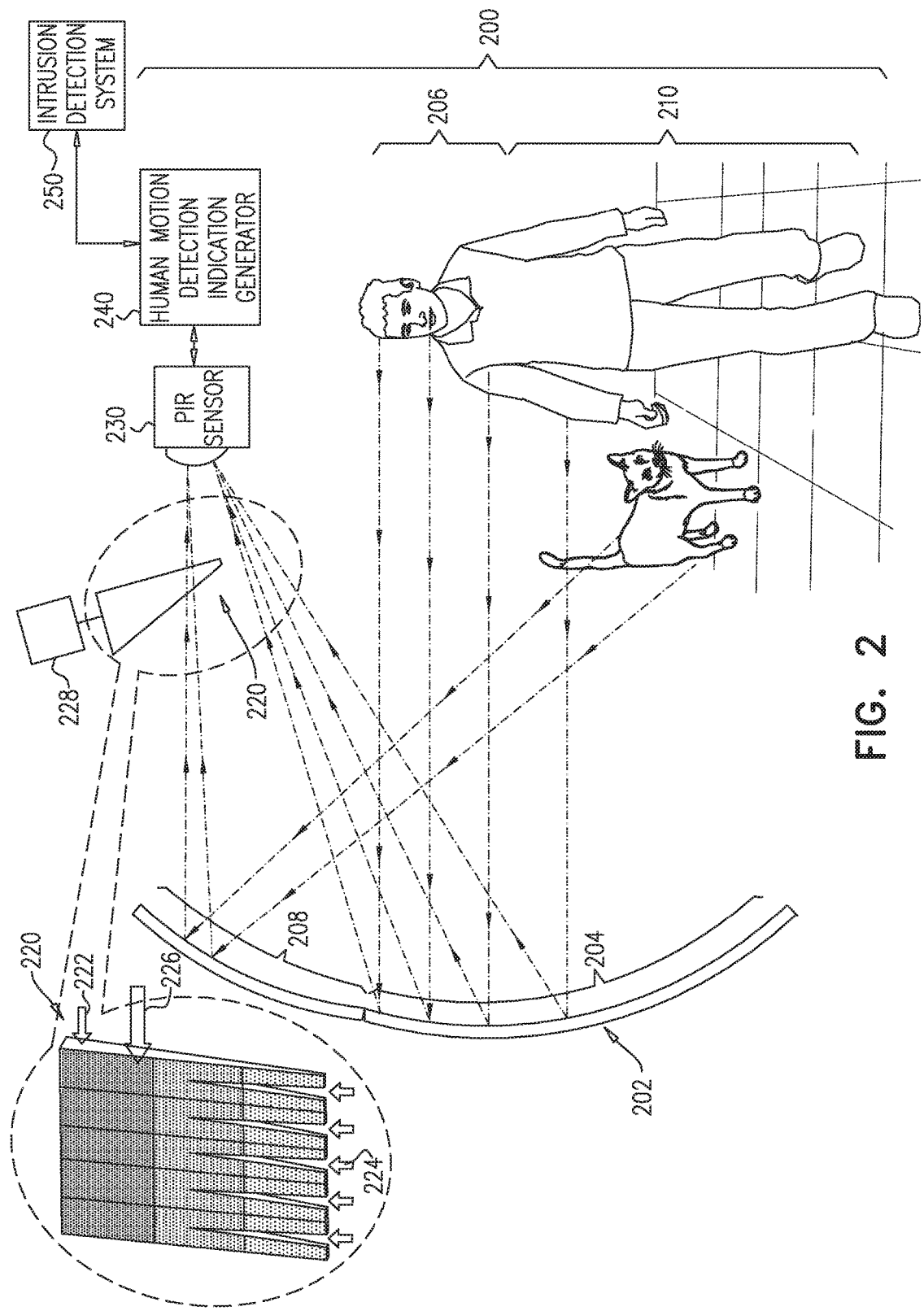
FIG. 2 is a simplified illustration of a motion detection system, constructed and operative in accordance with an alternative embodiment of the present invention.

Reference is now made to FIG. 2, which is a simplified illustration of a motion detection system, constructed and operative in accordance with an alternative embodiment of the present invention.

As shown in FIG. 2, there is provided a motion detection system 200 including a focusing mirror such as, for example, segmented mirror 202. As illustrated in FIG. 2, segmented mirror 202 is preferably a concave focusing mirror. Segmented mirror 202 preferably includes a lower segment 204 having a first degree of focus and is arranged to focus infrared radiation originating from an upper detection field 206. It is appreciated that upper detection field 206 preferably includes an area which is generally at an elevation accessible to humans but generally inaccessible to house pets, such as a height typical of an upper part of a typical human body. Upper motion detection field 206 thereby preferably defines an area wherein infrared radiation emitting therefrom is typically human-generated infrared radiation. Therefore, infrared radiation focused by lower segment 204 will typically be indicative of human motion within upper detection field 206.

Segmented mirror 202 preferably also includes an upper segment 208 having a second degree of focus and is arranged to focus infrared radiation originating from a lower motion detection field 210. It is appreciated that lower motion detection field 210 preferably includes an area which is generally at a height accessible to house pets, thereby defining an area wherein at least part of infrared radiation emitting therefrom is typically pet-generated infrared radiation.

It is further appreciated that, in the example of FIG. 2, the second degree of focus of upper segment 208 is of a lesser degree than the first degree of focus of lower segment 204, resulting in focusing of typically pet-generated infrared radiation to a lesser degree than typically human-generated infrared radiation and facilitating reliable detection, by motion detection system 200, of typically human-generated infrared radiation, while ignoring typically pet-generated infrared radiation.

It is yet further appreciated that while lower motion detection field 210 preferably includes an area which is generally at an elevation accessible to house pets, humans, particularly the lower body part thereof, may also traverse lower motion detection field 210. Therefore, infrared radiation focused by upper segment 208 may include pet-generated infrared radiation and human-generated infrared radiation, being indicative of either human or pet motion within lower motion detection field 210. Furthermore, in other embodiments of the present invention, mirror 202 may be non-segmented, and may be operable to equally focus infrared radiation originating from either upper motion detection field 206 or lower motion detection field 210, thereby hampering differentiation therebetween by motion detection system 200.

To further differentiate between typically human-generated infrared radiation originating from upper motion detection field 206 and typically pet-generated infrared radiation emitting from lower motion detection field 210, a variably positionable optical attenuator 220 is preferably arranged for variable positioning thereof opposite segmented mirror 202, and is preferably operable for variably attenuating at least a portion of the infrared radiation focused by segmented mirror 202. It is appreciated that at least one of an extent and a magnitude of the attenuation of variably positionable optical attenuator 220 is dependent on at least one of a position of variably positionable optical attenuator 220 opposite the segmented mirror and a set of physical characteristics of variably positionable optical attenuator 220.

It is a particular feature of the present preferred embodiment that variably positionable optical attenuator 220 may be positioned to attenuate typically pet-generated infrared radiation originating from lower motion detection field 210 to at least one of a greater extent and a greater magnitude than that of typically human-generated infrared radiation originating from upper motion detection field 206, preferably resulting in an intensity of the attenuated typically pet-generated infrared radiation which is below a human-generated infrared radiation detection threshold and facilitating reliable detection, by motion detection system 200, of typically human-generated infrared radiation, while ignoring typically pet-generated infrared radiation.

In the example of FIG. 2, variably positionable optical attenuator 220 may be positioned opposite upper segment 208 of segmented mirror 202, thereby attenuating infrared radiation originating from lower motion detection field 210 and which is typically pet-generated, to a greater extent than infrared radiation originating from upper motion detection field 206 and which is typically human-generated. Positioning of variably positionable optical attenuator opposite segmented mirror 202 may be achieved manually or automatically by a motorized position controller 228.

It is appreciated that the intensity of infrared radiation emitted by humans or pets may be dependent on an ambient temperature of the environment. It is therefore also appreciated that the desired position of variably positionable optical attenuator 220 opposite segmented mirror 202 to attenuate infrared radiation originating from lower motion detection field 210 to a greater extent than infrared radiation originating from upper motion detection field 206 may be ambient temperature-dependent. It is therefore appreciated that both manual and automatic variable positioning of variably positionable optical attenuator 220 opposite said segmented mirror 202 may be ambient temperature-dependent.

Furthermore, as shown in FIG. 2, a set of physical characteristics of variably positionable optical attenuator 220 may include, for example, a variable thickness 222 of variably positionable optical attenuator 220. It is appreciated that variably positionable optical attenuator 220 is preferably formed of a material which is at least partially transparent to infrared radiation, such as polyethylene, wherein the degree of transparency of variably positionable optical attenuator 220 is at least partially determined by thickness 222 thereof. It is a particular feature of the present preferred embodiment that variably positionable optical attenuator 220 is preferably formed with a thickness 222 which varies over a vertical dimension thereof, thereby providing varying degrees of attenuation of infrared radiation focused by segmented mirror 202, which varying degrees of attenuation correspond with the position of variably positionable optical attenuator 220 opposite segmented mirror 202.

In the example of FIG. 2, thickness 222 of variably positionable optical attenuator 220 is greater in a portion of variably positionable optical attenuator 220 positioned opposite upper segment 208 of segmented mirror 202 than in a portion of variably positionable optical attenuator 220 positioned opposite lower segment 204 of segmented mirror 202, thereby attenuating infrared radiation originating from lower motion detection field 210, which is typically pet-generated, by a greater magnitude than infrared radiation originating from upper motion detection field 206 and which is typically human-generated, preferably resulting in an intensity of attenuated typically pet-generated infrared radiation which is below a human-generated infrared radiation detection threshold and facilitating reliable detection, by motion detection system 200, of typically human-generated infrared radiation, while ignoring typically pet-generated infrared radiation.

As further illustrated in FIG. 2, the set of physical characteristics of variably positionable optical attenuator 220 may also include, for example, a multiplicity of apertures 224 formed in variably positionable optical attenuator 220. It is appreciated that apertures 222 are preferably arranged to allow at least part of infrared radiation focused by segmented mirror 202 to freely pass therethrough without being attenuated by variably positionable optical attenuator 220. It is therefore another particular feature of the present preferred embodiment of the present invention that variably positionable optical attenuator 220 provides varying degrees and extent of attenuation of infrared radiation focused by segmented mirror 202, which varying degrees and extent of attenuation also correspond to the position of apertures 224 of variably positionable optical attenuator 220 opposite segmented mirror 202.

In the example of FIG. 2, apertures 224 of variably positionable optical attenuator 220 are positioned opposite upper segment 208 of segmented mirror 202, thereby allowing part of infrared radiation originating from upper motion detection field 206, which is typically human-generated, to freely pass therethrough without being attenuated by variably positionable optical attenuator 220, preferably resulting in an intensity of attenuated typically pet-generated infrared radiation which is below a human-generated infrared radiation detection threshold and facilitating reliable detection, by motion detection system 200, of typically human-generated infrared radiation, while ignoring typically pet-generated infrared radiation.

As yet further illustrated in FIG. 2, the set of physical characteristics of variably positionable optical attenuator 220 may also include, for example, a scattering surface 226 of variably positionable optical attenuator 220, which scattering surface 226 is formed to at least partially scatter at least part of the infrared radiation focused by segmented mirror 202. It is appreciated that the scattering nature of scattering surface 226 typically corresponds, for example, to the physical characteristics of the material forming scattering surface 226. It is therefore another particular feature of the present preferred embodiment of the present invention that variably positionable optical attenuator 220 provides varying degrees and extent of attenuation of infrared radiation focused by segmented mirror 202, which varying degrees and extent of attenuation also correspond to the position and physical characteristics of scattering surface 226 of variably positionable optical attenuator 220 opposite segmented mirror 202.

In the example of FIG. 2, scattering surface 226 of variably positionable optical attenuator 220 is formed on a portion of variably positionable optical attenuator 220 positioned opposite upper segment 208 of segmented mirror 202, thereby scattering and attenuating infrared radiation originating from lower motion detection field 210, which is typically pet-generated, by a greater magnitude than infrared radiation originating from upper motion detection field 206 and which is typically human-generated, preferably resulting in an intensity of attenuated typically pet-generated infrared radiation which is below a human-generated infrared radiation detection threshold and facilitating reliable detection, by motion detection system 200, of typically human-generated infrared radiation, while ignoring typically pet-generated infrared radiation.

Motion detection system 200 preferably also includes a PIR sensor 230 positioned opposite segmented mirror 202 and opposite the variably positionable optical attenuator 220. PIR sensor 230 is preferably operable for sensing at least part of the infrared radiation focused by segmented mirror 202 and at least part of the infrared radiation attenuated by variably positionable optical attenuator 220.

A human motion detection indication generator 240 preferably communicates with PIR sensor 230 and is preferably operable for ascertaining whether an intensity of infrared radiation sensed by PIR sensor 230 is above a human-generated infrared radiation detection threshold. It is appreciated that the intensity of infrared radiation emitted by humans or pets may be dependent on an ambient temperature of the environment. It is therefore appreciated that the human-generated infrared radiation detection threshold may be ambient temperature-dependent.

Responsive to ascertaining that the intensity of infrared radiation sensed by PIR sensor 230 is above the human-generated infrared radiation detection threshold, human motion detection indication generator 240 is also preferably operable for generating an indication of detection of human motion. The indication of detection of human motion generated by human motion detection indication generator 240 may be communicated, for example, to a premises monitoring system or an intrusion detection system 250.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A motion detection system comprising:
a focusing lens arranged to focus infrared radiation,
a variably positionable optical attenuator arranged for variable positioning thereof opposite said focusing lens and operable for variably attenuating at least a portion of said infrared radiation focused by said focusing lens, at least one of an extent of said variably attenuated portion of said focused infrared radiation and a magnitude of said variable attenuation being dependent on at least one of a position of said variably positionable optical attenuator opposite said focusing lens and a set of physical characteristics of said variably positionable optical attenuator;
a PIR sensor positioned opposite said focusing lens and opposite said variably positionable optical attenuator, said PIR sensor being operable for sensing at least part of said focused infrared radiation focused by said focusing lens and at least part of said attenuated infrared radiation attenuated by said variably positionable optical attenuator; and
a human motion detection indication generator communicating with said PIR sensor and operable:
for ascertaining whether an intensity of infrared radiation sensed by said PIR sensor is above a human-generated infrared radiation detection threshold; and
responsive to ascertaining that said intensity of infrared radiation sensed by said PIR sensor is above said human-generated infrared radiation detection threshold, for generating an indication of detection of human motion.

2. A motion detection system according to claim 1 and wherein said focusing lens is arranged to focus infrared radiation originating from a human motion detection field comprising at least an area generally inaccessible to house pets, and infrared radiation originating from a house pet motion detection field comprising at least an area accessible to house pets.

3. A motion detection system according to claim 2 and wherein both said human motion detection field and said house pet motion detection field also comprises corresponding areas accessible to humans.

4. A motion detection system according to claim 2 and wherein said focusing lens is a segmented Fresnel lens comprising at least a first segment having a first degree of focus and arranged to focus said infrared radiation originating from said human motion detection field, and at least a second segment having a second degree of focus and arranged to focus infrared radiation originating from a house pet motion detection field.

5. A motion detection system according to claim 4 and wherein said segmented Fresnel lens is at least one of a spherical segmented Fresnel lens and a cylindrical segmented Fresnel lens.

6. A motion detection system according to claim 4 and wherein said second degree of focus is less than said first degree of focus.

7. A motion detection system according to claim 2 and wherein at least one particular position of said variably positionable optical attenuator opposite said focusing lens is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

8. A motion detection system according to claim 7 and wherein said at least one particular position of said variably positionable optical attenuator, arranged to attenuate said infrared radiation originating from said house pet motion detection field to said at least one of said extent and said magnitude resulting in said intensity of said attenuated infrared radiation originating from said house pet motion detection field which is below said human-generated infrared radiation detection threshold, is ambient temperature-dependent.

9. A motion detection system according to claim 2 and wherein at least one particular set of physical characteristics of said variably positionable optical attenuator is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

10. A motion detection system according to claim 2 and wherein at least one combination of at least one position of said variably positionable optical attenuator opposite said focusing lens and at least one particular set of physical characteristics of said variably positionable optical attenuator is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

11. A motion detection system according to claim 10 and wherein said at least one particular position of said variably positionable optical attenuator, arranged in combination with said at least one particular set of physical characteristics of said variably positionable optical attenuator to attenuate said infrared radiation originating from said house pet motion detection field to said at least one of said extent and said magnitude resulting in said intensity of said attenuated infrared radiation originating from said house pet motion detection field which is below said human-generated infrared radiation detection threshold, is ambient temperature-dependent.

12. A motion detection system according to claim 1 and wherein said human-generated infrared radiation detection threshold is ambient temperature-dependent.

13. A motion detection system according to claim 1 and wherein said set of physical characteristics of said variably positionable optical attenuator comprises at least one of:
 a variable thickness of said variably positionable optical attenuator;
 apertures formed in said variably positionable optical attenuator, said apertures being arranged to allow at least part of said focused infrared radiation to freely pass therethrough; and
 a scattering surface of said variably positionable optical attenuator, which scattering surface is formed to at least partially scatter at least part of said focused infrared radiation.

14. A motion detection system according to claim 1 and wherein said variably positionable optical attenuator is variably positionable between said focusing lens and said PIR sensor.

15. A motion detection system according to claim 1 and wherein said variably positionable optical attenuator is arranged for manual variable positioning thereof opposite said focusing lens.

16. A motion detection system according to claim 1 and wherein said variably positionable optical attenuator is arranged for automatic variable positioning thereof opposite said focusing lens.

17. A motion detection system according to claim 16 and also comprising a motorized position controller operable for automatically variably positioning said variably positionable optical attenuator opposite said focusing lens.

18. A motion detection system according to claim 16 and wherein said automatic variable positioning of said variably positionable optical attenuator opposite said focusing lens is ambient temperature-dependent.

19. A motion detection system comprising:
 a focusing mirror arranged to focus infrared radiation;
 a variably positionable optical attenuator arranged for variable positioning thereof opposite said focusing mirror and operable for variably attenuating at least a portion of said infrared radiation focused by said focusing mirror, at least one of an extent of said variably attenuated portion of said focused infrared radiation and a magnitude of said variable attenuation being dependent on at least one of a position of said variably positionable optical attenuator opposite said focusing mirror and a set of physical characteristics of said variably positionable optical attenuator;
 a PIR sensor positioned opposite said focusing mirror and opposite said variably positionable optical attenuator, said PIR sensor being operable for sensing at least part of said focused infrared radiation focused by said focusing mirror and at least part of said attenuated infrared radiation attenuated by said variably positionable optical attenuator; and
 a human motion detection indication generator communicating with said PIR sensor and operable:
  for ascertaining whether an intensity of infrared radiation sensed by said PIR sensor is above a human-generated infrared radiation detection threshold; and
  responsive to ascertaining that said intensity of infrared radiation sensed by said PIR sensor is above said human-generated infrared radiation detection threshold, for generating an indication of detection of human motion.

20. A motion detection system according to claim 19 and wherein said focusing mirror is arranged to focus infrared radiation originating from a human motion detection field comprising at least an area generally inaccessible to house pets, and infrared radiation originating from a house pet motion detection field comprising at least an area accessible to house pets.

21. A motion detection system according to claim 20 and wherein both said human motion detection field and said house pet motion detection field also comprises corresponding areas accessible to humans.

22. A motion detection system according to claim 20 and wherein said focusing mirror is a segmented mirror comprising at least a first segment having a first degree of focus and arranged to focus said infrared radiation originating from said human motion detection field, and at least a second segment having a second degree of focus and arranged to focus infrared radiation originating from a house pet motion detection field.

23. A motion detection system according to claim 22 and wherein said second degree of focus is less than said first degree of focus.

24. A motion detection system according to claim 20 and wherein at least one particular position of said variably positionable optical attenuator opposite said focusing mirror is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

25. A motion detection system according to claim 24 and wherein said at least one particular position of said variably positionable optical attenuator, arranged to attenuate said infrared radiation originating from said house pet motion detection field to said at least one of said extent and said magnitude resulting in said intensity of said attenuated infrared radiation originating from said house pet motion detection field which is below said human-generated infrared radiation detection threshold, is ambient temperature-dependent.

26. A motion detection system according to claim 20 and wherein at least one particular set of physical characteristics of said variably positionable optical attenuator is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

27. A motion detection system according to claim 20 and wherein at least one combination of at least one position of said variably positionable optical attenuator opposite said focusing mirror and at least one particular set of physical characteristics of said variably positionable optical attenuator is suitable for attenuating, by said variably positionable optical attenuator, said infrared radiation originating from said house pet motion detection field to at least one of an extent and a magnitude resulting in an intensity of said attenuated infrared radiation originating from said house pet motion detection field which is below said human-generated infrared radiation detection threshold.

28. A motion detection system according to claim 27 and wherein said at least one particular position of said variably positionable optical attenuator, arranged in combination with said at least one particular set of physical characteristics of said variably positionable optical attenuator to attenuate said infrared radiation originating from said house pet motion detection field to said at least one of said extent and said magnitude resulting in said intensity of said attenuated infrared radiation originating from said house pet motion detection field which is below said human-generated infrared radiation detection threshold, is ambient temperature-dependent.

29. A motion detection system according to claim 19 and wherein said human-generated infrared radiation detection threshold is ambient temperature-dependent.

30. A motion detection system according to claim 19 and wherein said set of physical characteristics of said variably positionable optical attenuator comprises at least one of:
   a variable thickness of said variably positionable optical attenuator;
   apertures formed in said variably positionable optical attenuator, said apertures being arranged to allow at least part of said focused infrared radiation to freely pass therethrough; and
   a scattering surface of said variably positionable optical attenuator, which scattering surface is formed to at least partially scatter at least part of said focused infrared radiation.

31. A motion detection system according to claim 19 and wherein said variably positionable optical attenuator is variably positionable between said focusing mirror and said PIR sensor.

32. A motion detection system according to claim 19 and wherein said variably positionable optical attenuator is arranged for manual variable positioning thereof opposite said focusing mirror.

33. A motion detection system according to claim 19 and wherein said variably positionable optical attenuator is arranged for automatic variable positioning thereof opposite said focusing mirror.

34. A motion detection system according to claim 33 and also comprising a motorized position controller operable for automatically variably positioning said variably positionable optical attenuator opposite said focusing mirror.

35. A motion detection system according to claim 33 and wherein said automatic variable positioning of said variably positionable optical attenuator opposite said focusing mirror is ambient temperature-dependent.

36. A motion detection system according to claim 19 and wherein said focusing mirror is a concave mirror.

\* \* \* \* \*